No. 797,609. PATENTED AUG. 22, 1905.
E. A. SCHADE.
TOOL HANDLE.
APPLICATION FILED MAR. 7, 1903.
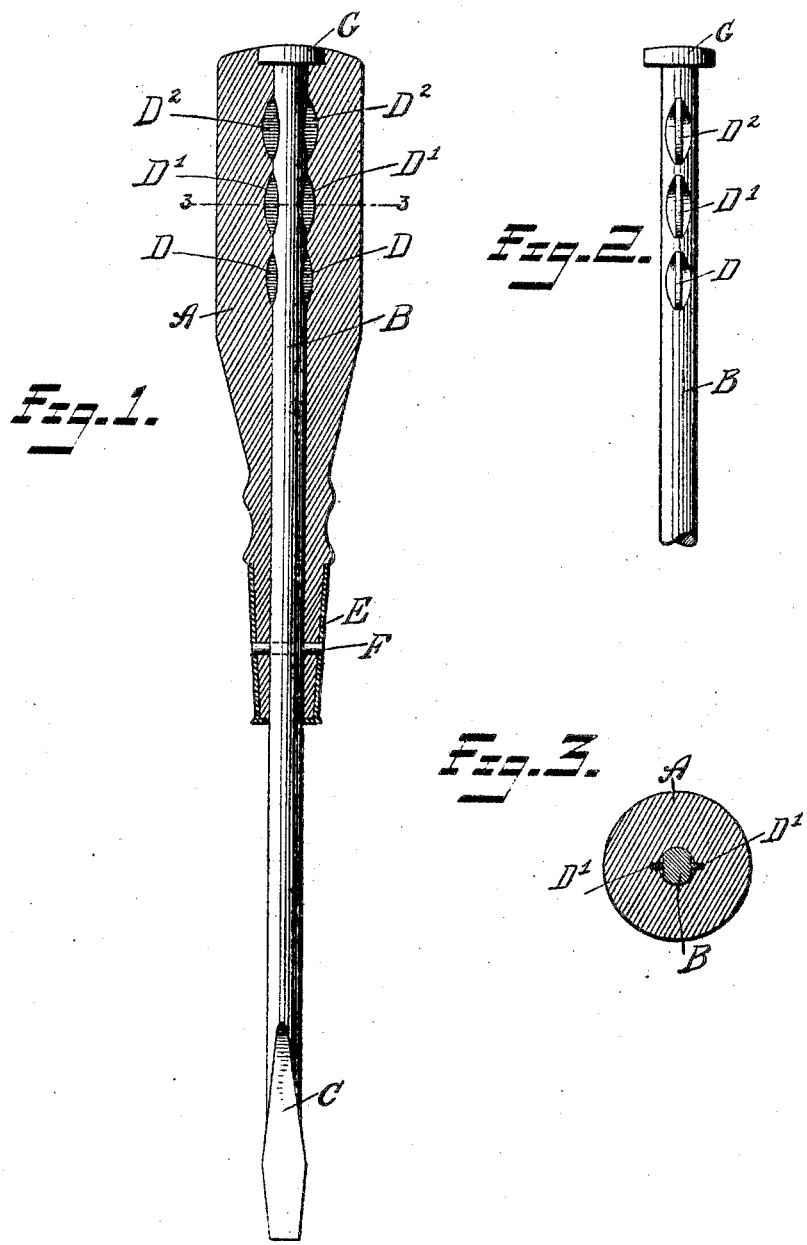
INVENTOR
Edmund A. Schade

UNITED STATES PATENT OFFICE.

EDMUND A. SCHADE, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

TOOL-HANDLE.

No. 797,609.      Specification of Letters Patent.      Patented Aug. 22, 1905.

Application filed March 7, 1903. Serial No. 146,643.

*To all whom it may concern:*

Be it known that I, EDMUND A. SCHADE, a citizen of the United States, residing at New Britain, in the county of Hartford, State of Connecticut, have invented certain new and useful Improvements in Tool-Handles, of which the following is a full, clear, and exact description.

My invention relates to means for securing tool-handles in place. The handles particularly referred to herein are such handles as are applied to hand-tools, including such instruments as awls, ice-picks, and screw-drivers.

The object of this invention is to provide a simple means for effectively uniting the tool-shank with the handle-body, so that a sufficient resistance will be provided to prevent one twisting on or in the other under all conditions of ordinary and intended use.

In the accompanying drawings, Figure 1 is a side elevation of one form of tool (a screw-driver) fitted with a handle after the manner of my invention, the handle being shown in section. Fig. 2 is a fragmentary portion of the shank of the handle. Fig. 3 is a cross-section on the plane of the line 3 3 of Fig. 1.

A is the main body of the handle, which may be of any suitable shape and may be longitudinally bored to receive the shank B. Upon the shank B and within the main body A are located laterally-projecting wings D D. In this particular instance the wings are formed on opposite sides of the shank B by displacing some of the metal, as between dies, causing said wings to assume the shape of a bulging lip which stands above the surface of the shank, so as to project into the handle-body A. It is desirable that a series of these projecting wings be formed in line, and to that end D' D' is a second set and $D^2$ $D^2$ a third set. It will be observed that the wings D' extend outward from the shank B slightly more than the projecting wings D. So, also, the projecting wings $D^2$ stand outward from the shank slightly more than the projecting wings D'. The smallest of the projecting wings D are arranged toward that end of the shank which is first introduced into the handle-body A. The bore of the handle-body A is of such a size as to snugly receive the shank B. When the parts are assembled, the shank is driven into the handle B in a direction to cause the smallest projecting wings to first encounter the interior wall of the body A. As the shank is driven in, the smallest wing D serves to cut its way in and partially form the cavity into which the next larger wing is to be driven. For example, in the drawings, Fig. 1, the shank is driven in from the top of the handle, so that the wing D first enters the shank and carves its way in. Then the wing D' enters the passage thus partially formed for it, at the same time enlarging the same slightly. Then the wing $D^2$ enters the passage and enlarges it still more. While the number of these projections at any one section of the shank is immaterial, it is desirable, and, in fact, essential to some tools that there be a plurality of them. It is preferable that they be arranged in a series gradually increasing in size, as shown in the drawings, so that when the body A and the shank B are assembled a permanent union may be effected.

E is a ferrule which may be placed upon the inner end of the handle-body A, and F is a pin which may be passed through the ferrule, body, and shank, said pin serving to supplement the function of the wings D in preventing the twisting of the body on the shank and also serving to prevent the ferrule E from slipping off.

G is a head which may be provided at the outer end of the shank B.

It should be observed that in the construction shown in the drawings the shank is introduced into the handle-body A prior to the formation of the enlarged screw-driver end C. Of course if the projections D D' $D^2$ were arranged in reverse order the shank would be driven into the handle in the opposite direction and the head G would be formed last.

It should be understood that the head G is not absolutely essential, nor is it essential that the operative end of the tool should be enlarged. For example, in the case of an ice-pick the operative end of the tool would be pointed. Hence it will be seen that the particular shape of the tool itself is immaterial.

The projecting wings are preferably formed integrally with the shank B, and their presence within the handle-body A provides sufficient resistance to prevent the handle twisting under all circumstances incidental to the ordinary and proper use of the tool. One advantage of providing a plurality of wings instead of one is that in some tools where it is necessary to provide substantial resistance to the twist to provide only one wing would require that wing to be made of such a size as to possibly break or split the handle in forcing the shank into place. By the plurality of wings in line one partially carves the way for the next and danger of breaking or splitting the body is avoided. While it is not absolutely essential that the size of the projections be graded, it is nevertheless preferable for the reasons aforesaid.

As the shank is being driven in place it will be noted that the material of the handle which is displaced by the wedging action of the wings just before they reach their final position is allowed to spring back into the spaces left behind them when finally seated. This relieves the handle from a great deal of the permanent strain which would otherwise occur and might split the handle, and it holds the handle from longitudinal displacement in either direction.

What I claim is—

1. In an article of the character described, the combination of a wooden handle-body, a metal shank having a series of lateral projections graded in size toward the head.

2. In an article of the character described, a shank, a series of pairs of projecting wings graded in size and having a plurality in longitudinal alinement, a handle-body fitted to said shank said projecting wings extending into said handle-body.

3. In an article of the character described, a shank, a series of projecting wings extending therefrom and arranged in longitudinal alinement and graded in size as to the extent of their projection, and a handle-body fitted to said shank, said wings extending into the material of said handle-body.

4. In an article of the character described, the combination of a wooden handle-body and a metal shank having a series of pairs of lateral projections graded in size and in longitudinal alinement.

5. An article of the character described comprising the combination of a handle-body formed with a longitudinal passage and a centrally-located recess at the head thereof, a metal shank substantially of the diameter of said passage and having a series of lateral projections graded in size toward the head and an enlarged head fitting into said recess.

EDMUND A. SCHADE.

Witnesses:
   H. S. WALTER,
   R. C. MITCHELL.